(12) United States Patent
Kita

(10) Patent No.: US 12,158,411 B2
(45) Date of Patent: Dec. 3, 2024

(54) OPTICAL MEASUREMENT APPARATUS AND INFORMATION PROCESSING SYSTEM

(71) Applicant: Sony Group Corporation, Tokyo (JP)

(72) Inventor: Koji Kita, Kanagawa (JP)

(73) Assignee: Sony Group Corporation, Tokyo (JP)

( * ) Notice: Subject to any disclaimer, the term of this patent is extended or adjusted under 35 U.S.C. 154(b) by 85 days.

(21) Appl. No.: 17/772,988

(22) PCT Filed: Oct. 23, 2020

(86) PCT No.: PCT/JP2020/039885
§ 371 (c)(1),
(2) Date: Apr. 28, 2022

(87) PCT Pub. No.: WO2021/090708
PCT Pub. Date: May 14, 2021

(65) Prior Publication Data
US 2023/0349809 A1    Nov. 2, 2023

(30) Foreign Application Priority Data
Nov. 6, 2019   (JP) .................................. 2019-201744

(51) Int. Cl.
*G01N 15/1434*   (2024.01)
*G01N 15/10*     (2006.01)

(52) U.S. Cl.
CPC . *G01N 15/1434* (2013.01); *G01N 2015/1006* (2013.01)

(58) Field of Classification Search
CPC ................... G01N 15/1434; G01N 2015/1006
See application file for complete search history.

(56) References Cited

U.S. PATENT DOCUMENTS

2013/0338479 A1   12/2013  Pogue et al.
2017/0350806 A1   12/2017  Sinha

FOREIGN PATENT DOCUMENTS

EP      2056090 A2 *  5/2009 ......... G01N 15/1425
JP      2003295365 A   10/2003
(Continued)

OTHER PUBLICATIONS

International Written Opinion and English translation thereof mailed Dec. 28, 2020 in connection with International Application No. PCT/JP2020/039885.
(Continued)

*Primary Examiner* — David P Porta
*Assistant Examiner* — Fani Polyzos Boosalis
(74) *Attorney, Agent, or Firm* — Wolf, Greenfield & Sacks, P.C.

(57) ABSTRACT

Multicolor analysis is enabled while suppressing increase in size. An optical measurement apparatus according to an embodiment is provided with: an excitation light source (101 to 103) that emits excitation light; a waveguide optical system (111, 112, 113, 114, 115) that guides the excitation light to a predetermined position along a predetermined light path; a fluorescence detection system (140) that detects fluorescence radiated from a particle by excitation of the particle present at the predetermined position by the excitation light; and a first scattered-light detection system (130) that detects first scattered light generated by scattering of the excitation light by the particle present at the predetermined position; wherein the waveguide optical system includes a separation optical system (115) that separates the fluorescence and the first scattered light among the light emitted in a predetermined direction from the predetermined position on the flow channel, the fluorescence detection system detects the fluorescence separated by the separation optical (Continued)

system, and the first scattered-light detection system detects the first scattered light separated by the separation optical system.

9 Claims, 5 Drawing Sheets

(56) References Cited

FOREIGN PATENT DOCUMENTS

| | | |
|---|---|---|
| JP | 2008-241361 A | 10/2008 |
| JP | 2009-145213 A | 7/2009 |
| JP | 2012-127922 A | 7/2012 |
| JP | 2018-105685 A | 7/2018 |
| WO | 2016/185623 A1 | 11/2016 |
| WO | 2019/167510 A1 | 9/2019 |

OTHER PUBLICATIONS

International Preliminary Report on Patentability and English translation thereof mailed May 19, 2022 in connection with International Application No. PCT/JP2020/039885.
Extended European Search Report issued Aug. 30, 2023 in connection with European Application No. 20885128.7.
PCT/JP2020/039885, date of mailing Dec. 28, 2020, International Search Report.
International Search Report and English translation thereof mailed Dec. 28, 2020 in connection with International Application No. PCT/JP2020/039885.

* cited by examiner

OPTICAL MEASUREMENT APPARATUS AND INFORMATION PROCESSING SYSTEM

CROSS-REFERENCE TO RELATED APPLICATIONS

This application claims the benefit under 35 U.S.C. § 371 as a U.S. National Stage Entry of International Application No. PCT/JP2020/039885, filed in the Japanese Patent Office as a Receiving Office on Oct. 23, 2020, which claims priority to Japanese Patent Application Number 2019-201744, filed in the Japanese Patent Office on Nov. 6, 2019, each of which is hereby incorporated by reference in its entirety.

FIELD

The present disclosure relates to an optical measurement apparatus and an information processing system.

BACKGROUND

Conventionally, optical measurement methods using flow cytometry are used in the analysis of living-body related particles such as cells, microorganisms, and liposomes. A flow cytometer is an apparatus for carrying out optical measurement using flow cytometry which radiates light to the particles flowing in a flow channel formed in a flow cell, a microchip, or the like and executes analysis or the like by detecting fluorescence or scattered light emitted from each of the particles.

The flow cytometer includes, for example, an analyzer for analyzing a sample and a sorter provided with a function to analyze a sample and sort and collect only the particles having particular characteristics based on the analysis result. Also, a sorter which uses cells as samples and is provided with a function to sort and collect the cells based on analysis results is also called "cell sorter".

Also, recently, based on demands from basic medicine and clinical discipline, flow cytometers capable of carrying out multicolor analysis using plural fluorescent pigments have been developed. The flow cytometers capable of carrying out multicolor analysis include multichannel-type and spectrum-type flow cytometers. In the multichannel-type or spectrum-type flow cytometer, fluorescence emitted from particles in a particular direction is separated by a spectroscopy optical system and enters an array light detector.

CITATION LIST

Patent Literature

Patent Literature 1: JP 2009-145213 A
Patent Literature 2: JP 2012-127922 A

SUMMARY

Technical Problem

However, there has been a problem that an overall apparatus including an optical system becomes large to enable multicolor analysis, for example, since plural excitation light source have to be provided.

Therefore, the present disclosure proposes an optical measurement apparatus and an information processing system which enable multicolor analysis while suppressing increase in size.

Solution to Problem

To solve the above-described problem, an optical measurement apparatus according to one aspect of the present disclosure comprises: an excitation light source that emits excitation light; a waveguide optical system that guides the excitation light to a predetermined position along a predetermined light path; a fluorescence detection system that detects fluorescence radiated from a particle by excitation of the particle present at the predetermined position by the excitation light; and a first scattered-light detection system that detects first scattered light generated by scattering of the excitation light by the particle present at the predetermined position, wherein the waveguide optical system includes a separation optical system that separates the fluorescence and the first scattered light among the light emitted in a predetermined direction from the predetermined position, the fluorescence detection system detects the fluorescence separated by the separation optical system, and the first scattered-light detection system detects the first scattered light separated by the separation optical system.

DESCRIPTION OF EMBODIMENTS

Hereinafter, an embodiment of the present disclosure will be described in detail based on drawings. In the following embodiment, the same parts are denoted by the same reference signs to omit redundant descriptions.

Also, the present disclosure is described in accordance with the order of items shown below.

1. Overall Configuration of Apparatus
  1.1 Rough Configuration Example of Optical System
  1.2 Rough Configuration Example of Information Processing System
  1.3 Timing Control Example Using Forward-scattered Light
  1.4 About Alignment
2. Rough Configuration of Microchip
3. Effects of Separating Fluorescence and Backscattered Light by Using Dichroic Mirror 1. Overall Configuration of Apparatus First, an overall configuration of an optical measurement apparatus according to the present embodiment will be described in detail with reference to drawings. Note that, in the present embodiment, a cell analysis apparatus is shown as an example of the optical measurement apparatus. The cell analysis apparatus according to the present embodiment may be, for example, a flow cytometer.

Also, in the present embodiment, a microchip method is shown as an example of a supplying method of microparticles to an observation point (hereinafter, referred to as a spot) on a flow channel. However, the supplying method is not limited thereto, and, for example, any of various methods such as a droplet method, a cuvette method, and a flow cell method can be employed. Furthermore, techniques according to the present disclosure are not limited to a cell sorter, but can be applied to various optical measurement apparatuses, which measure microparticles passing through a spot set on a flow channel, such as an analyzer-type flow cytometer and a microscope which obtains images of microparticles on a flow channel.

1.1 Rough Configuration Example of Optical System

Figure 1:
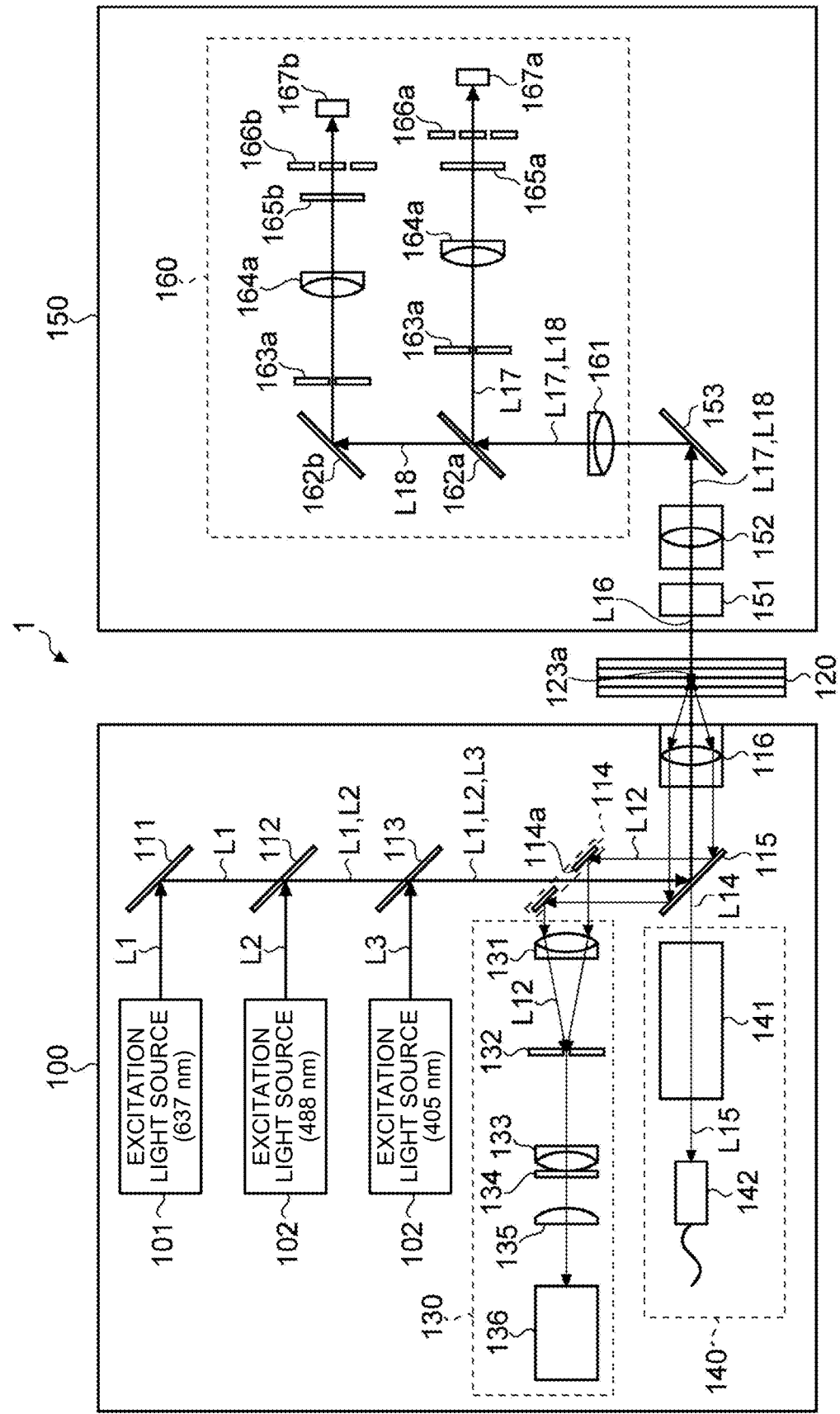
FIG. 1 is a schematic diagram illustrating a rough configuration example of an optical system of a cell analysis apparatus according to an embodiment of the present disclosure.

FIG. 1 is a schematic diagram illustrating a rough configuration example of an optical system of a cell analysis apparatus according to the present embodiment. As illustrated in FIG. 1, a cell analysis apparatus 1 is provided with, for example, one or more (three in the present example) excitation light sources 101 to 103, a total reflection mirror 111, dichroic mirrors 112 and 113, a perforated mirror 114, a dichroic mirror 115, an objective lens 116, a microchip 120, a backscattered-light detection system 130, a fluorescence detection system 140, a filter 151, a collimator lens 152, a total reflection mirror 153, and a forward-scattered-light detection system 160.

In this configuration, the total reflection mirror 111, the dichroic mirrors 112 and 113, the perforated mirror 114, and the dichroic mirror 115 constitute a waveguide optical system which guides excitation light L1 to L3, which has been emitted from the excitation light sources 101 to 103, to a predetermined light path. Among these, the dichroic mirror 115 forms a separation optical system, which separates fluorescence (for example, fluorescence L14) and scattered light (for example, backscattered light L12) from the light emitted in a predetermined direction (for example, to the back) from a spot 123a set on a flow channel in the microchip 120. Also, the perforated mirror 114 constitutes a reflection optical system which reflects the scattered light (for example, the backscattered light L12), which has been separated by the above described separation optical system, to a light path (for example, a light path toward the later-described backscattered-light detection system 130) different from the above described predetermined light path.

Also, the objective lens 116 constitutes a condensing optical system which condenses the excitation light L1 to L3, which has propagated through the above described predetermined light path, onto the spot 123a set on the flow channel in the microchip 120. Note that the number of the spot (s) 123a is not limited to one. Therefore, each of the excitation light L1 to L3 may be condensed at a different spot. Also, the condensing positions of the excitation light L1 to L3 are not required to be the same as the spot (s) 123a, but may be shifted therefrom.

In the example illustrated in FIG. 1, the three excitation light sources 101 to 103, which emit the excitation light L1 to L3 having mutually different wavelengths, are provided. For example, laser light sources which emit coherent light may be used as the excitation light sources 101 to 103. For example, the excitation light source 102 may be DPSS laser (Diode Pumped Solid State Laser), which radiates a blue laser beam (peak wavelength: 488 nanometers (nm), output: 20 mW). Also, the excitation light source 101 may be a laser diode, which radiates a red laser beam (peak wavelength: 637 nm, output: 20 mW). Similarly, the excitation light source 103 may be a laser diode, which radiates a near-ultraviolet laser beam (peak wavelength: 405 nm, output: 8 mW). Also, the excitation light L1 to L3 emitted from the excitation light sources 101 to 103 may be pulsed light.

The total reflection mirror 111 may be, for example, a total reflection mirror which reflects the excitation light L1, which has been emitted from the excitation light source 101, toward a predetermined direction.

The dichroic mirror 112 is an optical element for causing an optical axis of the excitation light L1 reflected by the total reflection mirror 111 and an optical axis of the excitation light L2 emitted from the excitation light source 102 to match or be parallel to each other. The dichroic mirror 112, for example, allows the excitation light L1, which is from the total reflection mirror 111, to transmit therethrough and reflects the excitation light L2, which is from the excitation light source 102. As this dichroic mirror 112, for example, a dichroic mirror designed to allow transmission of the light having a wavelength of 637 nm and reflect the light having a wavelength of 488 nm may be used.

The dichroic mirror 113 is an optical element for causing optical axes of the excitation light L1 and L2 from the dichroic mirror 112 and an optical axis of the excitation light L3 emitted from the excitation light source 103 to match or be parallel to each other. The dichroic mirror 113, for example, allows the excitation light L1, which is from the total reflection mirror 111, to transmit therethrough and reflects the excitation light L3, which is from the excitation light source 103. As this dichroic mirror 113, for example, a dichroic mirror designed to allow transmission of the light having a wavelength of 637 nm and the light having a wavelength of 488 nm and reflect the light having a wavelength of 405 nm may be used.

The excitation light L1 to L3, which has been finally collected by the dichroic mirror 113 as the light which travels in the same direction, enters the dichroic mirror 115 via a hole 114a provided in the perforated mirror 114.

Figure 2:
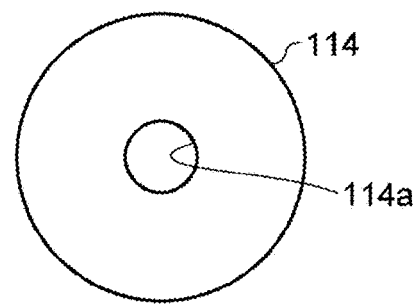
FIG. 2 is a diagram illustrating an example of a reflection surface of a perforated mirror according to the embodiment of the present disclosure.

Herein, the shape of the perforated mirror will be described by using FIG. 2 and FIG. 3. FIG. 2 is a diagram illustrating an example of a reflection surface of the perforated mirror according to the present embodiment, and FIG. 3 is a cross-sectional view illustrating dimensions in a case in which the perforated mirror according to the present embodiment is installed on a light path of excitation light.

As illustrated in FIG. 2, the perforated mirror 114, for example, has a structure in which the hole 114a is provided approximately at the center of a circular reflection surface. The reflection surface of the perforated mirror 114 is designed to reflect, for example, at least the light having a wavelength of 488 nm which corresponds to the excitation light L2.

Figure 3:
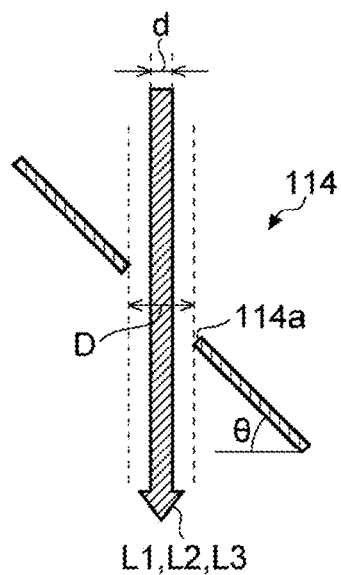
FIG. 3 is a cross-sectional view illustrating dimensions in a case in which the perforated mirror according to the embodiment of the present disclosure is installed on a light path of excitation light.

As illustrated in FIG. 3, the perforated mirror 114 is disposed to be tilted at a predetermined angle (for example, 45 degrees) with respect to the light axes of the excitation light L1 to L3 in order to reflect, in a direction different from the optical axes of the excitation light L1 to L3, at least part of the backscattered light L12 from the spot 123a set in the later-described microchip 120. Note that the later-described backscattered-light detection system 130 is disposed in the traveling direction of the backscattered light L12 reflected by the perforated mirror 114.

Also, as illustrated in FIG. 3, the perforated mirror 114 is disposed on the light path of the excitation light L1 to L3 so that the optical axes of the excitation light L1 to L3 pass through approximately the center of the hole 114a. Herein, the diameter of the hole 114a is only required that a shortest diameter D of the hole 114a viewed from the optical axis direction be at least larger than a diameter d of a beam cross section of the collected excitation light L1 to L3, for example, in a case in which the perforated mirror 114 is installed to be tilted at an angle of θ with respect to the optical axes of the excitation light L1 to L3. Note that, for example in a case in which the beam cross section is circular, the diameter of the beam cross section may be the diameter of an area in which a beam intensity in this beam cross section is equal to or higher than a predetermined value.

For example, a numerical aperture NA of the collected excitation light L1 to L3 is 0.15, the numerical aperture of the hole 114a viewed from the direction tilted by the angle θ is only required to be 0.15 or higher. However, in a case in which the hole 114a is too large, the numerical aperture of the hole 114a is preferred to be as small as possible since the backscattered light L12, which enters the backscattered-light detection system 130, is reduced.

Note that the shape of the reflection surface of the perforated mirror 114 and the shape of the hole 114a are not limited to circular shapes, but may be oval shapes, polygonal shapes, etc. Furthermore, the shape of the reflection surface of the perforated mirror 114 and the shape of the hole 114a do not have to be similar to each other, but may have shapes which are independent from each other.

Figure 4:
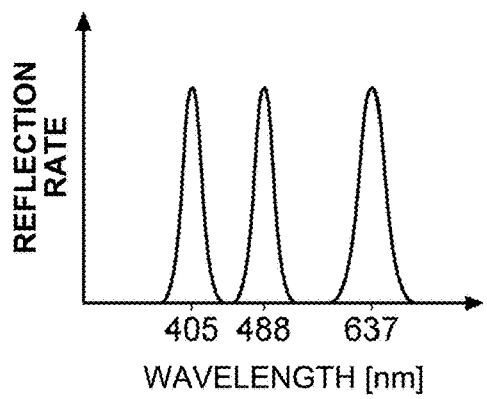
FIG. 4 is a diagram illustrating an example of light transmission characteristics of a dichroic mirror according to the embodiment of the present disclosure.

Returning to FIG. 1, descriptions will be given. The dichroic mirror 115 to which the excitation light L1 to L3, which has passed through the hole 114a, enters is, for example, designed to reflect the light having a wavelength of 637 nm corresponding to the excitation light L1, the light having a wavelength of 488 nm corresponding to the excitation light L2, and the light having a wavelength of 405 nm corresponding to the excitation light L3 and allow transmission of the light having other wavelengths as illustrated in FIG. 4. Therefore, the excitation light L1 to L3, which has entered the dichroic mirror 115, is reflected by the dichroic mirror 115 and enters the objective lens 116.

Note that, on the light path from the excitation light sources 101 to 103 to the objective lens 116, a beam shaping unit for converting the excitation light L1 to L3 to parallel light may be provided. The beam shaping unit may include, for example, one or more lense (s) or mirror (s).

The objective lens 116 condenses the entered excitation light L1 to L3 at the predetermined spot 123a on the flow channel in the later-described microchip 120. When the spot 123a is irradiated with the excitation light L1 to L3, which is pulsed light, while microparticles are passing through the spot 123a, fluorescence is radiated from the microparticles, the excitation light L1 to L3 is scattered by the microparticles, and scattered light is generated.

In the present description, among the scattered light generated in all directions from the microparticles, the components within a predetermined angular range traveling forward in the traveling directions of the excitation light L1 to L3 are referred to as forward-scattered light, the components within a predetermined angular range traveling backward in the traveling direction of the excitation light L1 to L3 are referred to as backscattered light L12, and the components in the directions not within predetermined angles from the optical axes of the excitation light L1 to L3 are referred to as side-scattered light.

The objective lens 116, for example, has a numerical aperture corresponding to about 30 degrees to 40 degrees (for example, corresponding to the above described predetermined angle) with respect to the optical axis. The components (hereinafter, referred to as fluorescence L14) within the predetermined angular range traveling backward in the traveling direction of the excitation light L1 to L3 among the fluorescence radiated from the microparticles and the backscattered light L12 transmit through the objective lens 116 and enters the dichroic mirror 115.

Among the fluorescence L14 and the backscattered light L12 which has entered the dichroic mirror 115, the fluorescence L14 transmits through the dichroic mirror 115 and enters the fluorescence detection system 140.

On the other hand, the backscattered light L12 is reflected by the dichroic mirror 115, is further reflected by the perforated mirror 114, and enters the backscattered-light detection system 130. Herein, the numerical aperture of the hole 114a of the perforated mirror 114 is assumed to be a numerical aperture of about 20 degrees (for example, NA≈0.2) with respect to the optical axis, and the numerical aperture of the objective lens 116 is assumed to be a numerical aperture of about 40 degrees with respect to the optical axis. In such a case, the backscattered light L12 within an angular range of about 20 degrees to 40 degrees with respect to the optical axis enters the backscattered-light detection system 130. In other words, the backscattered light L12 having a donut-shaped beam profile enters the backscattered-light detection system 130.

The backscattered-light detection system 130 is provided with, for example: plural lenses 131, 133, and 135 which shape the beam cross section of the backscattered light L12 reflected by the perforated mirror 114; a diaphragm 132 which adjusts the light intensity of the backscattered light L12; a mask 134 which selectively allows transmission of the light having particular wavelengths (for example, the light having a wavelength of 488 nm corresponding to the excitation light L2) among the backscattered light L12; and a light detector 136 which detects the light which has transmitted through the mask 134 and the lens 135 and entered.

The diaphragm 132 may for example have a configuration of a light-shielding plate provided with a pinhole-like hole. This hole is only required to be larger than the width of the center-part hole (area in which laser intensity is low) of the backscattered light L12 having the donut-shaped beam profile.

The light detector 136 includes, for example, a two-dimensional image sensor, a photodiode, or the like and detects the light intensity and size of the light which has transmitted through the mask 134 and the lens 135 and entered. Signals detected by the light detector 136 are input to, for example, a later-described analysis system 212. Note that, in the analysis system 212, for example, the size, etc. of microparticles may be analyzed based on the input signals.

The fluorescence detection system 140 is provided with, for example, a spectroscopy optical system 141, which separates the entered fluorescence L14 into dispersed light L15, and a light detector 142, which detects the light intensity of the dispersed light L15 of each predetermined wavelength band (in other words, channel).

Figure 5:
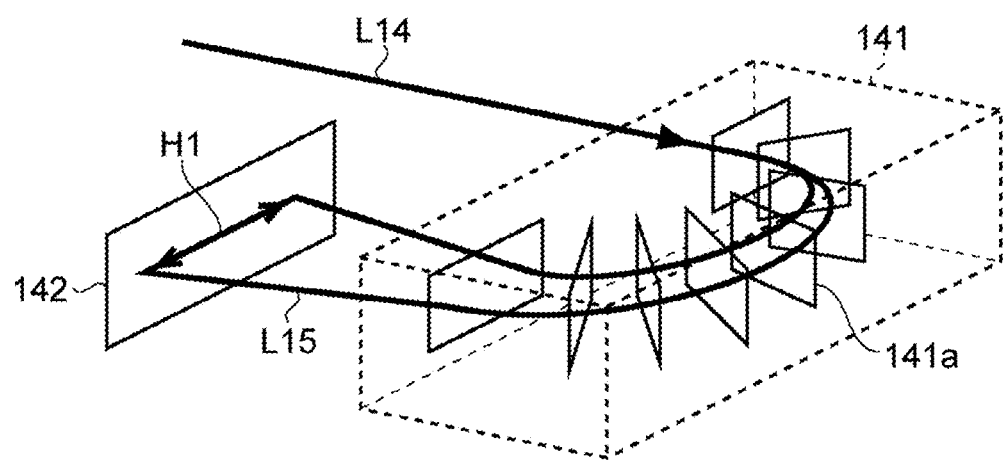
FIG. 5 is a diagram illustrating an example of a spectroscopy optical system according to the embodiment of the present disclosure.

Herein, FIG. 5 illustrates an example of the spectroscopy optical system 141 according to the present embodiment. As illustrated in FIG. 5, the spectroscopy optical system 141 includes, for example, one or more optical element(s) 141a such as prisms or diffraction grating and separates the entered fluorescence L14 into dispersed light 7L15, which is emitted at different angles at respective wavelengths.

Returning to FIG. 1, descriptions will be given. The light detector 142 may include, for example, plural light-receiving units which receive light of respective channels. In such a case, the plural light-receiving units may be arranged in one row or two or more rows in a light-separating direction H1 of the spectroscopy optical system 141. Also, as the light-receiving units, for example, photoelectric conversion elements such as photoelectron multiplier tubes can be used. Note that, as the light detector 142, a two-dimensional image sensor or the like can be also used instead of plural light-receiving units such as photoelectron multiplier tube array.

The signals indicating the light intensity of the fluorescence L14 of each channel detected by the light detector 142 are input to, for example, the later-described analysis system 212. Note that, in the analysis system 212, for example, component analysis, morphology analysis, etc. of microparticles may be executed based on the input signals.

1.2 Rough Configuration Example of Information Processing System

Figure 6:
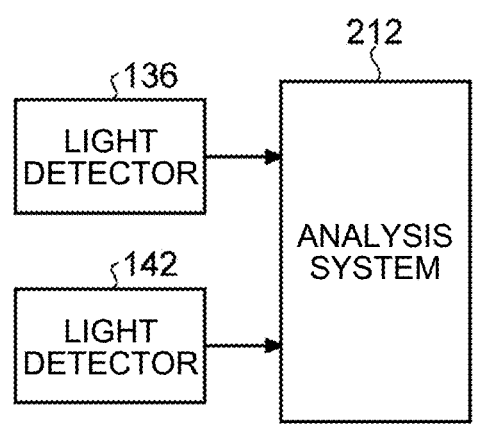
FIG. 6 is a block diagram illustrating a rough configuration example of an information processing system according to the embodiment of the present disclosure.

FIG. 6 is a block diagram illustrating a rough configuration example of an information processing system according to the present embodiment. As illustrated in FIG. 6, the information processing system is provided with, for example, the analysis system 212 which acquires signals from the light detector 142 and/or the light detector 136 and analyzes microparticles based on the acquired signals. Note that the signals generated by the light detectors 136 and 142 may be various signals such as image data and light signal information. Also, the analysis system 212 may be a local PC (personal computer), may be a cloud server, or may partially be a local PC and partially be a cloud server. Furthermore, if the cell analysis apparatus 1 is a sorter, the cell analysis apparatus 1 may be provided with a sorting control unit which controls sorting of microparticles (for example, cells) based on analysis results.

1.3 Timing Control Example Using Forward-Scattered Light

Returning to FIG. 1, descriptions will be given. In the present embodiment, the timing at which microparticles pass through the spot 123a set on the flow channel in the microchip 120 may be specified by using forward-scattered light. Therefore, in the present embodiment, the forward-scattered-light detection system 160 is provided.

Light L16 traveling forward in the traveling direction of the excitation light L1 to L3 from the microparticles includes forward-scattered light and the components within a predetermined angular range which travels forward in the traveling direction of the excitation light L1 to L3 among the fluorescence radiated from the microparticles. The filter 151, which is disposed in a downstream side compared with the microchip 120 in the light path of the excitation light L1 to L3, selectively allows transmission of, for example, the light (forward-scattered light L17) having a wavelength 637 nm corresponding to the excitation light L1 and the light (forward-scattered light L18) having a wavelength of 488 nm corresponding to the excitation light L2 among these light components and blocks the light of other wavelengths.

Figure 7:
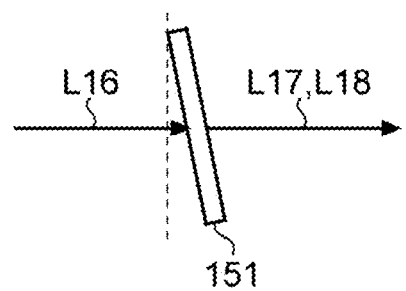
FIG. 7 is a schematic diagram illustrating a filter according to the embodiment of the present disclosure installed with respect to an optical axis of the light traveling forward in a traveling direction of the excitation light from microparticles.

FIG. 7 is a schematic diagram illustrating the filter installed with respect to the optical axis of the light traveling forward in the traveling direction of the excitation light from the microparticles. As illustrated in FIG. 7, the filter 151 is disposed to be tilted with respect to the optical axis of the light L16. By virtue of this, the returning light of the light L16 reflected by the filter 151 is prevented from entering the backscattered-light detection system 130, etc. via the objective lens 116, etc.

The forward-scattered light L17 and L18, which has passed through the filter 151, is converted to parallel light when the light passes through the collimator lens 152. Then, the light is reflected in a predetermined direction by the total reflection mirror 153 and enters the forward-scattered-light detection system 160.

The forward-scattered-light detection system 160 is provided with a lens 161, a dichroic mirror 162a, a total reflection mirror 162b, diaphragms 163a and 163b, lenses 164a and 164b, filters 165a and 165b, diffraction grating 166a and 166b, light detectors 167a and 167b.

The dichroic mirror 162a is designed to reflect the forward-scattered light L17, which is the scattered light of the excitation light L1, and allows transmission of the forward-scattered light L18, which is the scattered light of the excitation light L2, among the forward-scattered light L17 and L18 reflected by the total reflection mirror 153.

The lens 161 and the lens 164a function as an optical system which shapes the beam cross section of the forward-scattered light L17 which travels in the light path sandwiched therebetween. The diaphragm 163a adjusts the light intensity of the forward-scattered light L17, which enters the light detector 167a. The filter 165a and the diffraction grating 166a function as an optical filter which increases the degree of purity of the forward-scattered light L17 in the light which enters the light detector 167a. The light detector 167a, for example, includes a photodiode and detects the entrance of the forward-scattered light L17.

Similarly, the lens 161 and the lens 164b function as an optical system which shapes the beam cross section of the forward-scattered light L18 which travels in the light path sandwiched therebetween. The diaphragm 163b adjusts the light intensity of the forward-scattered light L18, which enters the light detector 167b. The filter 165b and the diffraction grating 166b function as an optical filter which increases the degree of purity of the forward-scattered light L18 in the light which enters the light detector 167b. The light detector 167b, for example, includes a photodiode and detects the entrance of the forward-scattered light L18.

In this manner, as a configuration for detecting forward-scattered light, the present embodiment is provided with two systems, i.e., the detection system (the lenses 161 and 164a, the diaphragm 163a, the filter 165a, the diffraction grating 166a, and the light detector 167a) which detects the forward-scattered light L17 and the detection system (the lenses 161 and 164b, the diaphragm 163b, the filter 165b, the diffraction grating 166b, and the light detector 167b) which detects the forward-scattered light L18. In such a case, the timing detected by either one of the detection systems (for example, the detection system which detects the forward-scattered light L18) can be compensated for by the timing detected by the other detection system (for example, the detection system which detects the forward-scattered light L17). However, the configuration is not limited to such a configuration. For example, either one of the detection systems may be omitted. Note that the timing referred to herein may be the timing at which the microparticles pass through the spot 123a set on the flow channel in the microchip 120.

1.4 About Alignment

Note that, in the above configuration, the optical system for irradiating the spot 123a with the excitation light L1 to L3 and the detection system for detecting the fluorescence L14 and the backscattered light L12 from the spot 123a, in other words, the excitation light sources 101 to 103, the total reflection mirror 111, the dichroic mirrors 112 and 113, the perforated mirror 114, the dichroic mirror 115, and the objective lens 116 may be mounted on a single base 100. Also, the detection system for detecting the forward-scattered light L17 and L18 from the spot 123a, in other words, the backscattered-light detection system 130, the fluorescence detection system 140, the filter 151, the total reflection mirror 153, and the forward-scattered-light detection system 160 may be mounted on a single base 150, which is different from the base 100. Furthermore, the base 100 and the base 150 may be able to carry out alignment with each other.

2. Rough Configuration of Microchip

Figure 8:
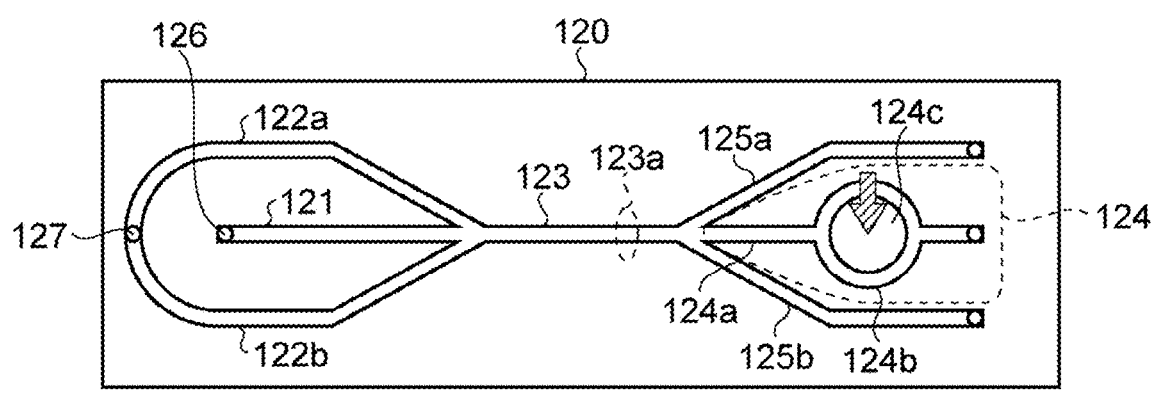
FIG. 8 is a diagram schematically illustrating a rough configuration of a microchip according to the embodiment of the present disclosure.

Subsequently, the microchip according to the present embodiment will be described. FIG. 8 is a diagram schematically illustrating a rough configuration of the microchip according to the present embodiment. As illustrated in FIG. 8, the microchip 120 of the present embodiment is provided with a sample-solution introducing flow channel 121, from which a sample solution 126 containing the microparticles is introduced, and a pair of sheath-solution introducing flow channels 122a and 122b, from which a sheath solution 127 is introduced. Note that, for example, if an observation object is a biological matter, the microparticles may contain cells, cell groups, tissues, etc. However, the observation object is not limited thereto, and various microparticles can be employed as observation objects.

The sheath-solution introducing flow channels 122a and 122b converge with the sample-solution introducing flow channel 121 from both sides, and one converging flow channel 123 is provided in the downstream side of the converging point thereof. In the converging flow channel 123, the circumference of the sample solution 126 is surrounded by a sheath solution 127 so that the solution flows in a state in which a laminar flow is formed. By virtue of this, the microparticles in the sample solution 126 flow while the microparticles are arranged approximately in one row with respect to the flow direction.

On the other hand, at a downstream-side end of the converging flow channel 123, a negative-pressure suction unit 124 for sorting the microparticles serving as collection objects and disposal flow channels 125a and 125b for discharging microparticles, etc. which are not the collection objects are provided. All of these are communicated with the converging flow channel 123. Note that downstream-side ends of the disposal flow channels 125a and 125b are coupled to, for example, a waste solution tank or the like. In the microchip 120, individual microparticles are detected in the converging flow channel 123, only the microparticles which have been determined to be the collection objects as a result are pulled into the negative-pressure suction unit 124, and the microparticles other than those are discharged from the disposal flow channels 125a and 125b.

The configuration of the negative-pressure suction unit 124 is not particularly limited as long as the microparticles serving as collection objects can be suctioned at predetermined timing. For example, as illustrated in FIG. 8, the negative-pressure suction unit 124 may include a suction flow channel 124a communicated with the converging flow channel 123, a pressure chamber 124b formed in part of the suction flow channel 124a, and an actuator 124c which can expand the volume in the pressure chamber 124b at arbitrary timing. Note that a downstream-side end of the suction flow channel 124a is desired to be openable/closable by a valve (not illustrated) or the like.

Also, the pressure chamber 124b is coupled to the actuator 124c such as a piezoelectric element via a vibration plate.

Examples of the material that forms the microchip 120 includes polycarbonate, cycloolefin polymer, polypropylene, polydimethylsiloxane (PDMS), glass, and silicon. Particularly, polymer materials such as polycarbonate, cycloolefin polymer, and polypropylene are preferred to be used for formation since these are excellent in processability and can be duplicated at low cost by using a molding apparatus. In this manner, by employing the configuration in which plastic molded substrates are pasted to each other, the microchip 120 can be manufactured at low cost.

Note that, as described above, the method of supplying the microparticles to the spot on the flow channel in the present embodiment is not limited to the microchip method, but various methods such as a droplet method, a cuvette method, and a flow cell method can be employed.

Figure 9:
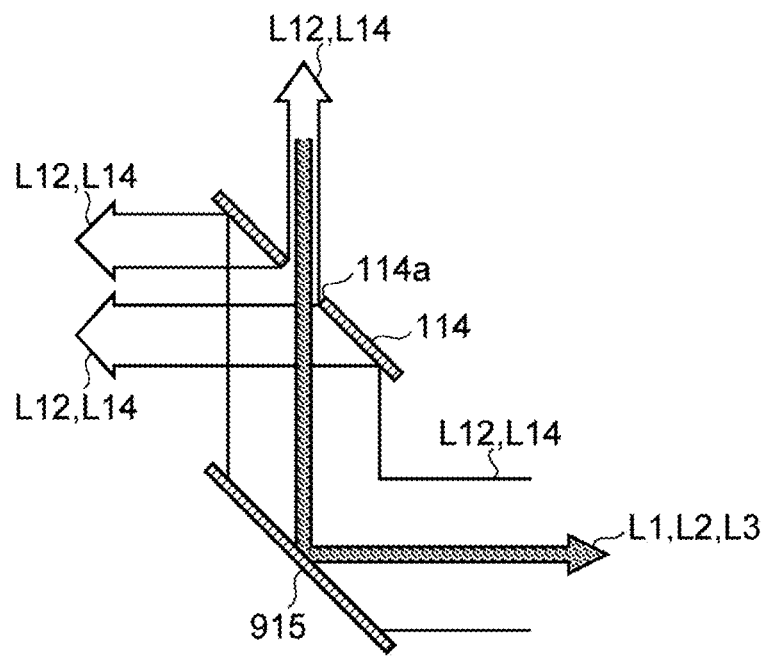
FIG. 9 is a diagram for describing a case according to a comparative example in which fluorescence and backscattered light is not separated from each other.

3. Effects of Separating Fluorescence and Backscattered Light by Using Dichroic Mirror Subsequently, effects of separating the fluorescence L14 and the backscattered light L12 by using the dichroic mirror 115 will be described. FIG. 9 is a diagram for describing a case according to a comparative example in which fluorescence and backscattered light is not separated, and FIG. 10 is a diagram for describing the case according to the present embodiment in which the fluorescence and the backscattered light is separated.

As illustrated in FIG. 9, if a total reflection mirror 915 is used instead of the dichroic mirror 115, the fluorescence L14 and the backscattered light L12 is not separated from each other, is reflected by the perforated mirror 114, and enters detection systems. Note that, as the detection system, it is assumed that a detection system which detects the backscattered light L12 and a detection system which detects the fluorescence L14 are disposed on the optical axis of the fluorescence L14 and the backscattered light L12 reflected by the perforated mirror 114.

If the fluorescence L14 and the backscattered light L12 is not separated from each other in this manner, the fluorescence L14 in the vicinity of the optical axis having a comparatively high beam intensity goes through the hole 114a of the perforated mirror 114. Therefore, the sensitivity of the detection system with respect to the fluorescence L14 is lowered, and the detection efficiency and detection accuracy is lowered. Note that the fluorescence L14 and the backscattered light L12, which has gone through the hole 114a, may be absorbed, for example, by a beam damper, which is not illustrated.

Figure 10:
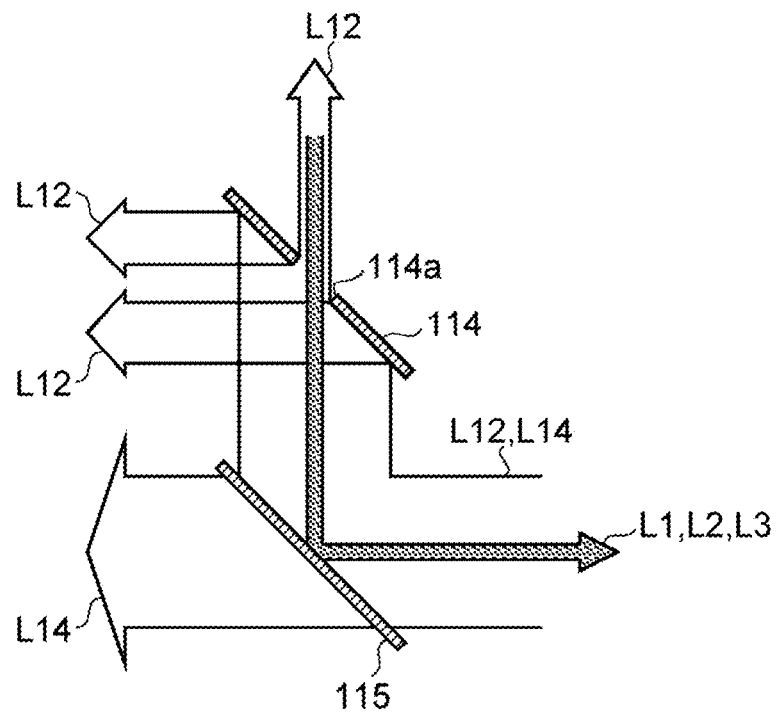
FIG. 10 is a diagram for describing a case according to the embodiment of the present disclosure in which fluorescence and backscattered light is separated from each other.

On the other hand, when the fluorescence L14 and the backscattered light L12 is configured to be separated from each other by the dichroic mirror 115 before reflecting by the perforated mirror 114 like the present embodiment illustrated in FIG. 10, the fluorescence L14 in the vicinity of the optical axis having a comparatively high beam intensity can be caused to enter the fluorescence detection system 140 without wasting. As a result, sensitivity reduction of the fluorescence detection system 140 with respect to the fluorescence L14 can be suppressed, and reduction in detection efficiency and reduction in detection accuracy can be therefore suppressed.

Hereinabove, the embodiment of the present disclosure has been described. However, the technical scope of the present disclosure is not limited to the above described embodiment without change, but various changes can be made within the scope not deviating from the gist of the present disclosure. Also, constituent elements of different embodiments and modification examples may be arbitrarily combined.

Also, the effects of the embodiments described in the present specification are merely examples, but are not limitative, and other effects may be exerted.

The present techniques can also employ following configurations.

(1)
An optical measurement apparatus comprising:
an excitation light source that emits excitation light;
a waveguide optical system that guides the excitation light to a predetermined position along a predetermined light path;
a fluorescence detection system that detects fluorescence radiated from a particle by excitation of the particle present at the predetermined position by the excitation light; and
a first scattered-light detection system that detects first scattered light generated by scattering of the excitation light by the particle present at the predetermined position, wherein
the waveguide optical system includes a separation optical system that separates the fluorescence and the first scattered light among the light emitted in a predetermined direction from the predetermined position,
the fluorescence detection system detects the fluorescence separated by the separation optical system, and
the first scattered-light detection system detects the first scattered light separated by the separation optical system.

(2)
The optical measurement apparatus according to (1), wherein the separation optical system is a dichroic mirror.

(3)
The optical measurement apparatus according to (1) or (2), wherein
the first scattered light is backscattered light propagated along the predetermined light path from the predetermined position toward the excitation light source, and
the separation optical system is disposed on the predetermined light path.

(4)
The optical measurement apparatus according to (3), wherein the separation optical system reflects the excitation light propagated along the predetermined light path and, among the light propagated along the predetermined light path from the predetermined position, allows transmission of the fluorescence and reflects the first scattered light.

(5)
The optical measurement apparatus according to (4), wherein
the waveguide optical system further includes a reflection optical system that reflects the first scattered light, which has been separated by the separation optical system, toward a light path different from the predetermined light path,
the reflection optical system has an opening in a reflection surface and is disposed on the predetermined light path so that the predetermined light path passes through the opening, and
the first scattered-light detection system detects the first scattered light reflected by the reflection optical system.

(6)
The optical measurement apparatus according to any one of (1) to (5), wherein
the excitation light source includes plural excitation light sources that emit excitation light having mutually different wavelengths, and
the waveguide optical system further includes an optical system that causes optical axes of the excitation light emitted respectively from the plural excitation light sources to match or be parallel to each other.

(7)
The optical measurement apparatus according to any one of (1) to (6), further comprising:
a second scattered-light detection system that detects second scattered light traveling from the predetermined position in a direction different from the first scattered light; and
a timing control device that controls emission timing of the excitation light from the excitation light source based on timing of the second scattered light detected by the second scattered-light detection system.

(8)
The optical measurement apparatus according to any one of (1) to (8), further comprising a condensing optical system that condenses, onto a predetermined position on a flow channel, the excitation light propagated on the predetermined light path.

(9)
An information processing system comprising:
an excitation light source that emits excitation light;
a waveguide optical system that guides the excitation light to a predetermined position along a predetermined light path;
a fluorescence detection system that detects fluorescence radiated from a particle by excitation of the particle present at the predetermined position by the excitation light;
a scattered-light detection system that detects scattered light generated by scattering of the excitation light by the particle present at the predetermined position; and
an analysis unit that analyzes at least one of a detection result acquired by the fluorescence detection system and a detection result acquired by the scattered-light detection system, wherein
the waveguide optical system includes a separation optical system that separates the fluorescence and the scattered light among the light emitted in a predetermined direction from the predetermined position,
the fluorescence detection system detects the fluorescence separated by the separation optical system, and
the scattered-light detection system detects the scattered light separated by the separation optical system.

(10)
The information processing system according to (9), further comprising a sorting mechanism that selectively sorts the particle based on an analysis result by the analysis unit, the particle having been passed through the predetermined position.

REFERENCE SIGNS LIST

1 Cell Analysis Apparatus
100, 150 Base
101 to 103 Excitation Light Source
111, 153, 162b Total Reflection Mirror 112, 113 Dichroic Mirror
114 Perforated Mirror
114a Hole
115, 162a Dichroic Mirror
116 Objective Lens
120 Microchip
123a Spot
130 Backscattered-Light Detection System
131, 133, 135, 161, 164a, 164b Lens
132, 163a, 163b Diaphragm
134 Mask
136, 142, 167a, 167b Light Detector
140 Fluorescence Detection System
141 Spectroscopy Optical System
151 Filter
165a, 165b Filter
152 Collimator Lens
166a, 166b Diffraction Grating
L1 to L3 Excitation Light
L12 Backscattered Light
L14 Fluorescence
L16 Light
L17, L18 Forward-Scattered Light

The invention claimed is:

1. An optical measurement apparatus comprising:
an excitation light source that emits excitation light;
a waveguide optical system that guides the excitation light to a predetermined position along a predetermined light path;
a fluorescence detection system that detects fluorescence radiated from a particle by excitation of the particle present at the predetermined position by the excitation light;
a first scattered-light detection system that detects first scattered light generated by scattering of the excitation light by the particle present at the predetermined position, wherein
the waveguide optical system includes a separation optical system that separates the fluorescence and the first scattered light among the light emitted in a predetermined direction from the predetermined position,
the fluorescence detection system detects the fluorescence separated by the separation optical system, and
the first scattered-light detection system detects the first scattered light separated by the separation optical system; and
a second scattered-light detection system that detects second scattered light traveling from the predetermined position in a direction different from the first scattered light; and
a timing control device that controls emission timing of the excitation light from the excitation light source based on timing of the second scattered light detected by the second scattered-light detection system.

2. The optical measurement apparatus according to claim 1, wherein the separation optical system is a dichroic mirror.

3. The optical measurement apparatus according to claim 1, wherein
the first scattered light is backscattered light propagated along the predetermined light path from the predetermined position toward the excitation light source, and
the separation optical system is disposed on the predetermined light path.

4. The optical measurement apparatus according to claim 3, wherein the separation optical system reflects the excitation light propagated along the predetermined light path and, among the light propagated along the predetermined light path from the predetermined position, allows transmission of the fluorescence and reflects the first scattered light.

5. The optical measurement apparatus according to claim 4, wherein
the waveguide optical system further includes a reflection optical system that reflects the first scattered light, which has been separated by the separation optical system, toward a light path different from the predetermined light path,
the reflection optical system has an opening in a reflection surface and is disposed on the predetermined light path so that the predetermined light path passes through the opening, and
the first scattered-light detection system detects the first scattered light reflected by the reflection optical system.

6. The optical measurement apparatus according to claim 1, wherein
the excitation light source includes plural excitation light sources that emit excitation light having mutually different wavelengths, and
the waveguide optical system further includes an optical system that causes optical axes of the excitation light emitted respectively from the plural excitation light sources to match or be parallel to each other.

7. The optical measurement apparatus according to claim 1, further comprising a condensing optical system that condenses, onto a predetermined position on a flow channel, the excitation light propagated on the predetermined light path.

8. An information processing system comprising:
an excitation light source that emits excitation light;
a waveguide optical system that guides the excitation light to a predetermined position along a predetermined light path;
a fluorescence detection system that detects fluorescence radiated from a particle by excitation of the particle present at the predetermined position by the excitation light;
a scattered-light detection system that detects scattered light generated by scattering of the excitation light by the particle present at the predetermined position; and
an analysis unit that analyzes at least one of a detection result acquired by the fluorescence detection system and a detection result acquired by the scattered-light detection system, wherein
the waveguide optical system includes a separation optical system that separates the fluorescence and the scattered light among the light emitted in a predetermined direction from the predetermined position,
the fluorescence detection system detects the fluorescence separated by the separation optical system, and
the scattered-light detection system detects the scattered light separated by the separation optical system; and
a second scattered-light detection system that detects second scattered light traveling from the predetermined position in a direction different from the first scattered light; and
a timing control device that controls emission timing of the excitation light from the excitation light source based on timing of the second scattered light detected by the second scattered-light detection system.

9. The information processing system according to claim 8, further comprising a sorting mechanism that selectively sorts the particle based on an analysis result by the analysis unit, the particle having been passed through the predetermined position.

* * * * *